(12) United States Patent
Qiu et al.

(10) Patent No.: US 10,256,733 B2
(45) Date of Patent: Apr. 9, 2019

(54) TAPPED WINDING FLYBACK CONVERTER FOR MULTIPLE OUTPUT VOLTAGES

(71) Applicant: Apple Inc., Cupertino, CA (US)

(72) Inventors: Weihong Qiu, Cupertino, CA (US); Rohan Dayal, Cupertino, CA (US); Zaki Moussaoui, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/200,898

(22) Filed: Jul. 1, 2016

(65) Prior Publication Data

US 2017/0093290 A1 Mar. 30, 2017

Related U.S. Application Data

(60) Provisional application No. 62/235,033, filed on Sep. 30, 2015.

(51) Int. Cl.
*H02M 3/335* (2006.01)
*H02M 1/08* (2006.01)

(52) U.S. Cl.
CPC ......... *H02M 3/33507* (2013.01); *H02M 1/08* (2013.01); *H02M 3/335* (2013.01); *H02M 3/33576* (2013.01)

(58) Field of Classification Search
CPC ............... H02M 3/33507; H02M 1/08; H02M 3/33576; H02M 3/335

(Continued)

(56) References Cited

U.S. PATENT DOCUMENTS 6,320,764 B1 * 11/2001 Jiang ................ H02M 3/33523
 323/255
6,459,595 B2 * 10/2002 Assow .............. H02M 3/33561
 363/21.14

(Continued)

FOREIGN PATENT DOCUMENTS

CN 104201896 A 12/2014
DE 3514567 C1 11/1986

(Continued)

OTHER PUBLICATIONS

Received STIC search report from EIC 2800 searcher Benjamin Martin on Apr. 4, 2017.*

(Continued)

*Primary Examiner* — Timothy J. Dole
*Assistant Examiner* — Htet Z Kyaw
(74) *Attorney, Agent, or Firm* — Blank Rome LLP (57) ABSTRACT

This disclosure relates to power converters capable of providing multiple output voltage levels. With respect to USB-C adapter design, the converter's output may need to be changed between different voltage levels, e.g., a low voltage (such as 5V, 10V), an intermediate voltage (such as 12V, 20V), or a high voltage (such as 20V, 40V)—based on the charging device's request. By using a tapped-winding transformer, the turns-ratio of a flyback transformer may be intelligently selected for high output voltage ranges, thus enabling the duty cycle to be kept the same for the low and intermediate voltage output levels. The flyback converter would then only need to accommodate the intermediate and high output voltages. For high output voltages, a switch may be activated to put the two windings of the transformer in series; for lower output voltages, the switch may be turned off, such that only one winding is used.

19 Claims, 7 Drawing Sheets

(58) Field of Classification Search
USPC .................................................. 363/21.12
See application file for complete search history.

(56) References Cited

U.S. PATENT DOCUMENTS

| | | | |
|---|---|---|---|
| 7,262,980 B2 | 8/2007 | Phadke | |
| 7,274,575 B2 | 9/2007 | Ramabhadran | |
| 8,040,704 B2 | 10/2011 | Cuk | |
| 8,488,340 B2* | 7/2013 | Zhang | H02M 1/4225 363/21.07 |
| 8,531,123 B2* | 9/2013 | Liu | H02M 3/33561 315/185 S |
| 9,559,601 B2* | 1/2017 | Persson | H02M 3/33538 |
| 2009/0212758 A1* | 8/2009 | Asinovski | H02M 1/10 323/355 |
| 2011/0181110 A1* | 7/2011 | Walley | H02J 7/022 307/31 |
| 2011/0310639 A1* | 12/2011 | Hsu | H02M 3/33561 363/21.14 |
| 2012/0314456 A1 | 12/2012 | Lanni | |
| 2013/0016530 A1* | 1/2013 | Lipcsei | H02M 1/40 363/16 |
| 2013/0229832 A1 | 9/2013 | Patel | |
| 2013/0279208 A1 | 10/2013 | Lai | |
| 2014/0098577 A1* | 4/2014 | Schroeder gen Berghegger | H02M 3/33523 363/21.04 |
| 2014/0185335 A1 | 7/2014 | Sims | |
| 2014/0192560 A1* | 7/2014 | Ou | H02M 1/40 363/16 |
| 2015/0015071 A1 | 1/2015 | Deboy | |
| 2015/0214848 A1* | 7/2015 | Umetani | H02M 3/07 363/21.12 |
| 2016/0049875 A1* | 2/2016 | Chueh | H02M 3/33576 363/15 |
| 2016/0072399 A1* | 3/2016 | Kikuchi | H02M 3/33592 363/21.14 |
| 2016/0087384 A1* | 3/2016 | Green | H01R 24/60 439/676 |
| 2016/0365801 A1* | 12/2016 | Phadke | H02M 3/33546 |
| 2017/0055031 A1* | 2/2017 | Park | G06F 13/4059 |
| 2017/0117971 A1* | 4/2017 | Sipes, Jr. | H04B 10/808 |
| 2017/0358994 A1* | 12/2017 | Ueno | H02M 1/10 |

FOREIGN PATENT DOCUMENTS

| | | |
|---|---|---|
| JP | 2002315329 A | 10/2002 |
| JP | 2008017663 A | 1/2008 |
| JP | 2012143112 A | 7/2012 |
| JP | 2015082913 A | 4/2015 |

OTHER PUBLICATIONS

Received STIC search report from EIC 2800 searcher Mesfin Getaneh on Mar. 14, 2018.*
TI Data Sheet (UCC24630); Mar. 2015.
Examination Report received in Australian Patent Application No. 2016204637, dated Jul. 6, 2017.
Extended European Search Report received in European Patent Application No. 16178812.0, dated May 31, 2017.
Final Office Action received in Japanese Patent Application No. 2016-139068, dated Apr. 23, 2018.
Notice of Last Preliminary Rejection received in Korean Patent Application No. 10-2016-0088495, dated Jun. 15, 2018.
Notice of Preliminary Rejection received in Korean Patent Application No. 10-2016-0088495, dated Dec. 1, 2017.
Office Action received in Chinese Patent Application No. 201610548370.8, dated Jun. 21, 2018.
Office Action received in Japanese Patent Application No. 2016-139068, dated Oct. 23, 2017.

* cited by examiner

FIG. 7

TAPPED WINDING FLYBACK CONVERTER FOR MULTIPLE OUTPUT VOLTAGES

CROSS-REFERENCE TO RELATED APPLICATION

This application claims priority to U.S. Provisional Application No. 62/235,033, filed on Sep. 30, 2015, the contents of which are entirely incorporated by reference herein.

BACKGROUND

This disclosure relates generally to flyback converter-based power converters that are capable of providing multiple output voltage levels in an efficient manner. Other embodiments are also described herein.

Alternating current (AC) power is typically supplied from wall outlets and is sometimes referred to as line power. Electronic devices often include circuitry that runs from direct current (DC) power. AC to DC power converter circuitry can be used to convert AC power to DC power. The DC power from such converter circuitry may be used to power an electronic device. The DC power may also be used to charge a battery in an electronic device.

AC to DC power converters often include transformers. A transformer in an AC to DC power converter may have primary and secondary windings. A pulse width modulation (PWM) circuit on the primary side of a transformer may generate pulses of current that pass through the primary winding of the transformer. On the secondary side of the transformer, a diode may be used to rectify the output of the secondary winding.

Some AC to DC power converter circuits use synchronous rectifier (SR) output stages. SR output stages may include a metal-oxide-semiconductor field-effect transistor (MOSFET). The MOSFET is driven so as to rectify the output waveform from the transformer in the same way that the diode is used in other power converter designs, while avoiding high diode voltage drops when conducting current (e.g., ~0.7V).

Certain power converter designs may have potential drawbacks. One drawback is that different electronic devices may have different voltage requirements, and a single power converter may not be able to satisfy all of the requirements of all the different devices. For instance, a laptop computer may require a higher amount of power during operation than the amount of power required by a mobile phone, e.g., a laptop could require two to three times the amount of power (or more) of a mobile phone. The power converter used to operate the mobile phone may not provide a sufficient amount of voltage to operate the laptop and the power converter used to operate the laptop may provide too much voltage and overpower the mobile phone.

To address some of these drawbacks, some power converters may employ a "tapped winding" configuration. A tapped winding transformer refers to a transformer where the turns-ratio of the transformer may be adjusted to produce high and low output voltage ranges, as desired. However, "tapped winding" configurations can result in an overly complex circuit design, e.g., when two or more voltage output levels are required. Thus, what is needed is an intelligent flyback converter design to support multiple output voltages, e.g., by using a transformer with a tapped secondary winding and one or more switching devices to control the duty cycle and perform synchronous rectification, that is able to regulate output power at two or more voltage output levels using a minimally-complex circuit design that is optimized for each of the two or more voltage output levels.

SUMMARY

Described herein are various devices and methods for operating improved flyback converters in which a transformer with a tapped secondary winding is used, along with one or more switching devices, to control the duty cycle and perform synchronous rectification.

Flyback converters with a wide range of available output voltages may be applicable in a number of power conversion contexts. For example, they may be particularly applicable in the context of the new USB-C standard. The USB-C industry standard is designed to be adaptable enough to be used for charging and transferring data to and from any device. Because a wider range of devices will soon support the USB-C standard, users will desire to use the same power adapter to charge all of their USB-C compatible devices. For power adapters designed to work with the USB-C standard, then, the flyback output of the adapter may need to be changed over a wide range of output voltages, based on the charging device's request.

The wide output voltage range, (e.g., from 5V to 12V to 20V, or from 10V to 20V to 40V, for example) and wide input voltage range (e.g., 90V to 265V) makes it very difficult to optimize the flyback converter design. It will be understood that these ranges are non-limiting examples provided to illustrate aspects of this disclosure. According to some embodiments, by using a tapped-winding design, the turn-ratio of the flyback transformer may be changed to produce a variety of output voltages, e.g., first, second, and third output voltages. More specifically, the turn-ratio may be selected, such that the operating parameters of the flyback converter, e.g., PWM (i.e., duty cycle), may be kept the same for the first output level (which may be a low output level, e.g., 5V) and second output level (which may be an intermediate output level, e.g., 12V). The flyback design then only needs to have unique operating parameters for the second output level (e.g., 12V) and third output level (which may be a high output level, e.g., 20V), resulting in a simpler design than prior art power adapters. Different operating parameters may also be determined (in conjunction with different turns-ratios) to produce the first and second output voltage levels.

According to some embodiments disclosed herein, one switch may be used to control the number of turns that are used in the tapped secondary winding of the transformer. According to such embodiments, a driver circuit may be used to turn the switch 'ON' (thus placing two windings of the tapped secondary winding in series with each other) for high voltage outputs, or turn the switch 'OFF' (thus using only one winding of the tapped secondary winding) for low voltage output. As mentioned above, the duty cycle of a second switch may also be used to control which output level—out of a plurality of 'high voltage' output levels—the converter will operate at.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above Summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness, a given figure may be used to illustrate the features of more than one embodiment of the invention, or more than one species of the invention, and not all elements in the figure may be required for a given embodiment or species.

DETAILED DESCRIPTION

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

Figure 1:
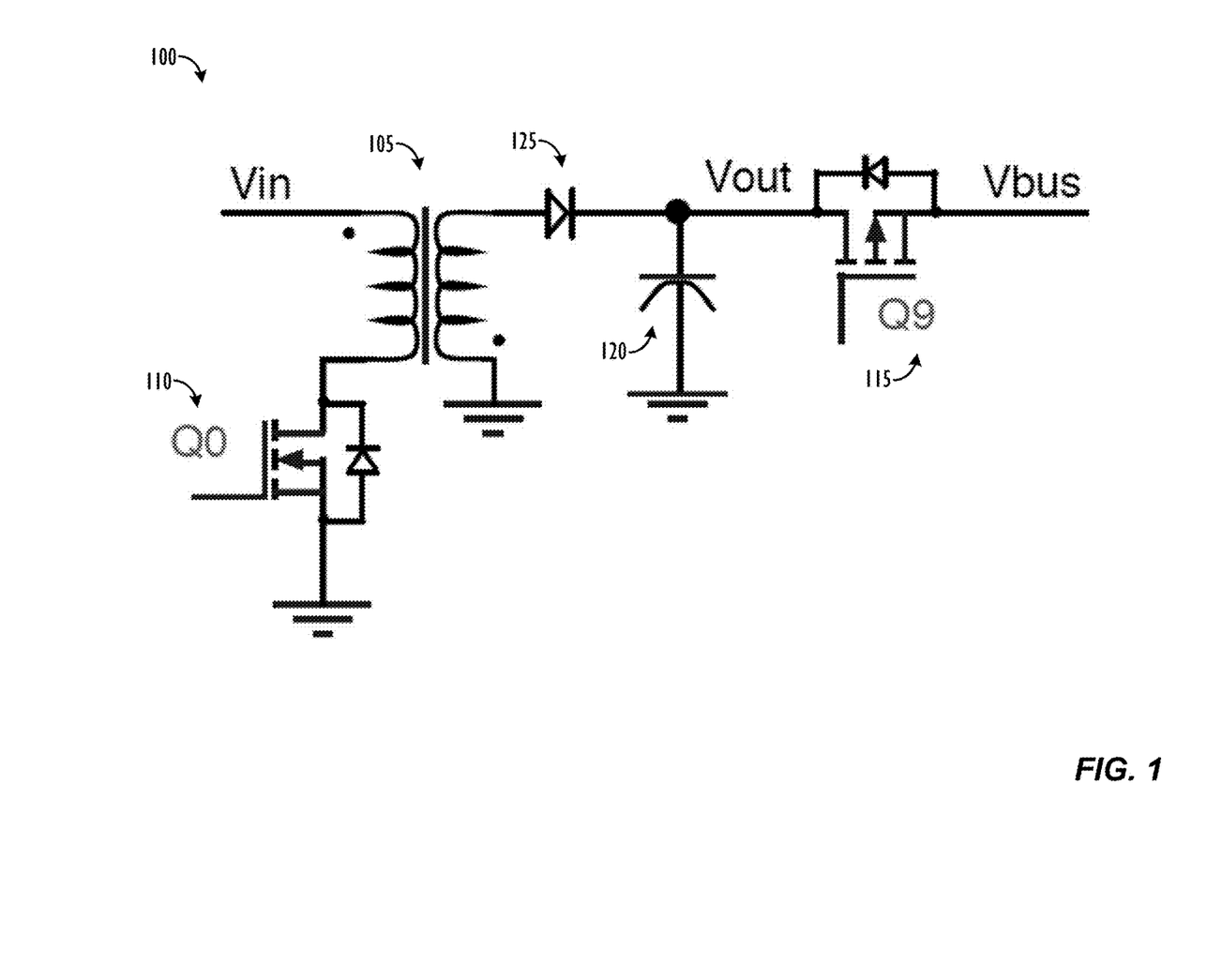
FIG. 1 illustrates a conventional flyback converter circuit.

Turning now to FIG. 1, a conventional flyback converter circuit 100 is shown. Flyback converter circuit 100 comprises transformer 105, which has a primary and a secondary winding. As shown in FIG. 1, the secondary side of transformer 105 is not tapped. Flyback converter circuit 100 further comprises a primary switching mechanism Q0 (110), which may comprise a P-FET, N-FET, or any other suitable power switch, for controlling the duty cycle of the flyback converter, that is, the amount of time during which the primary winding of transformer 105 (i.e., the left side, as shown in FIG. 1) is connected to the primary side input power source (not shown), thus storing energy in the primary winding of the transformer.

The output system comprises blocking diode 125 and output capacitor 120. When the switch Q0 110 is closed, the primary winding of the transformer 105 is directly connected to the input voltage source. The primary current and magnetic flux in the transformer 105 increases, thereby storing energy in the transformer. The voltage that is induced in the secondary winding of transformer 105 is negative, so the diode 125 is reverse-biased (i.e., blocking). During this time, the output capacitor 120 supplies energy, e.g., by outputting an output voltage to an output load. The output voltage, Vout, may be measured at point on Vbus. Switch Q9 (115), which may, e.g., be a P-FET, may be used to disconnect the output load under faulty conditions. When the switch 110 is opened, on the other hand, the voltage across the primary winding of transformer 105 reverses to try and maintain the primary current. The secondary voltage is positive, thus forward-biasing the diode 125 and allowing current to flow from the transformer 105 to the output load and output capacitor 120. The energy from the transformer core thus recharges the capacitor and supplies power to the secondary system load.

Some of the challenges associated with the design of the flyback converter circuit 100 of FIG. 1 include the wide output voltage range that is to be produced, as well as the wide input voltage range that will be provided to the converter. Further, a wide PWM duty cycle and switching frequency variation may be needed to cover the whole operating output range. Finally, it may be difficult to achieve the optimal circuit loop design to minimize transient responses when switching voltage output levels.

Figure 2:
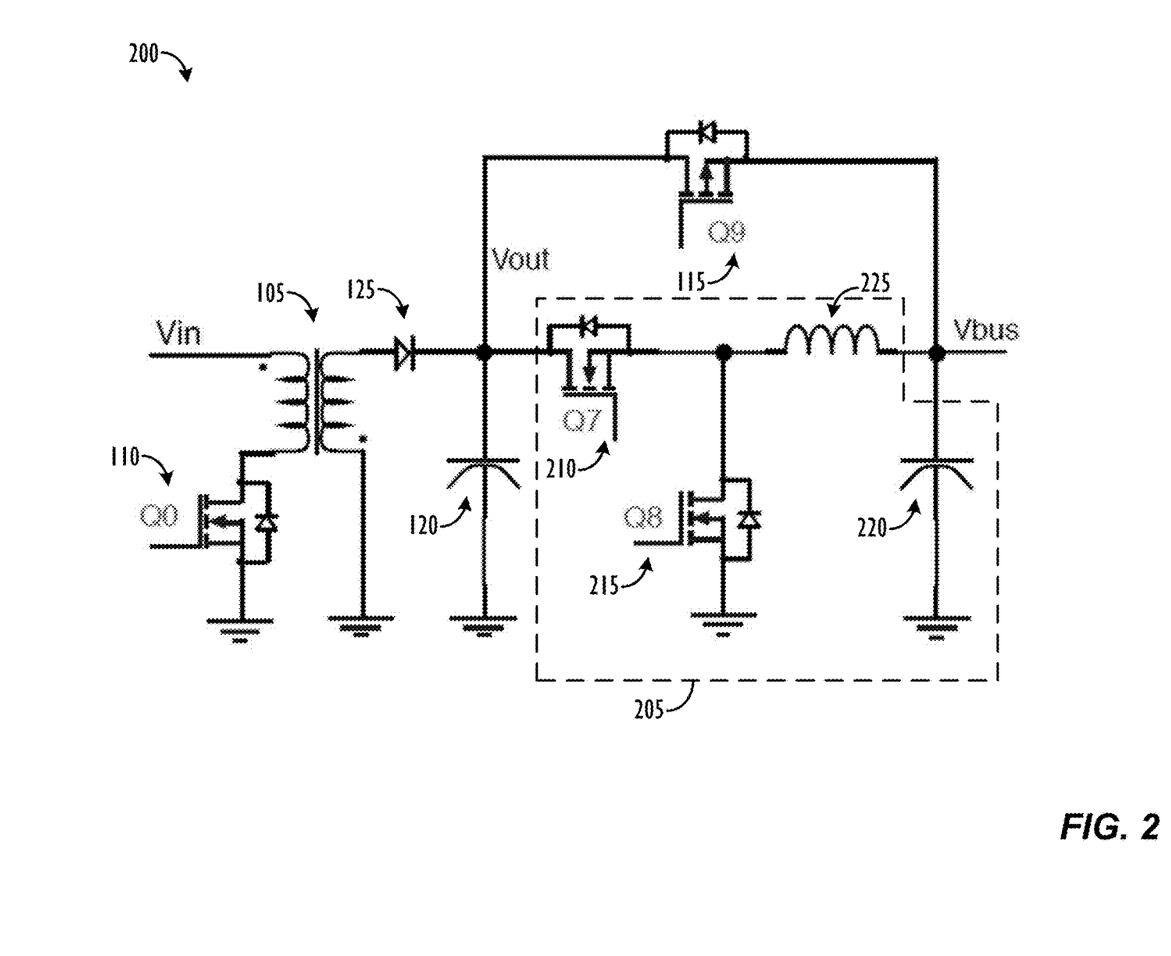
FIG. 2 illustrates a two-stage power converter scheme comprising a flyback converter circuit and a buck converter circuit.

Turning now to FIG. 2, the conventional flyback converter circuit 100 of FIG. 1 has been modified to comprise a two-stage power converter scheme 200 comprising a flyback converter circuit and a buck converter circuit 205. Buck converter 205 may comprise switching elements Q7 (210) and Q8 (215) to control the operation of the buck circuit, as well as inductor 225 and capacitor 220. Buck converter 205 may operate in the conventional fashion, i.e., as a step-down converter, in which the output voltage is lower than the input Voltage, and wherein both the input and output voltages are DC voltages. The inductor 225 may be used as an energy storage element that conducts an inductor current that is being switched to rise or to fall with time as desired, by associated power switching circuitry. The output capacitor 220 acts as a further energy storage element that helps smooth out a switching-induced ripple that is inherent on Vbus.

According to some embodiments, the flyback converter portion of circuit 200 may be used to regulate Vout at a certain voltage level, (e.g., 20V, 40V, etc.), while the buck converter portion 205 may be used to obtain voltages at Vbus which are lower than Vout, e.g., 5V or 12V. Switch Q9

(115) may be used to tie Vout to Vbus for a 20V output configuration. The design of circuit 200 has several advantages, such as simple design when operating at a fixed voltage output level and easy control over the Vbus voltage, with fast responses to the Vbus voltage transition. However, there are also several drawbacks to the design of circuit 200, such as: a large number of components with a high cost, lower than ideal efficiency (due to the additional buck converter stage), and the potential for an over-voltage event, e.g., if Q7 and Q9 are shortened, then the 20V Vout will push the Vbus voltage to much higher than the 5V or 12V level that is required by the charging device. It is to be understood that throughout this disclosure, recited output and input voltage values are provided to aid understanding of the concepts described. A first output voltage V1, may be lower than a second output voltage V2, which may in turn by lower than a third output voltage V3. Thus, for example, the values of 5V (V1), 12V (V2), and 20V (V3) are given as exemplary low (V1), intermediate (V2), and high output voltage (V3) levels. In a given implementation, the actual output levels may be different, such as 3.3V/12V/18V, 5V/9V/20V, 5V/15V/20V, 10V/20V/40V, or 12V/18V/24V, for example. Indeed, circuit topology design principles described herein may be employed to achieve whatever the desired range of output voltage levels are for a given implementation, in accordance with the inventive techniques disclosed herein.

One potential modification to the design of the flyback converter is the use of a "tapped winding" on the secondary winding of the transformer, that is, "tapping" into the secondary winding of the transformer at an intermediate position, in order to provide a voltage output that utilizes less than the total number of turns in the secondary winding. Several example embodiments of flyback converters employing a tapped secondary winding will now be described in greater detail.

Figure 3A:
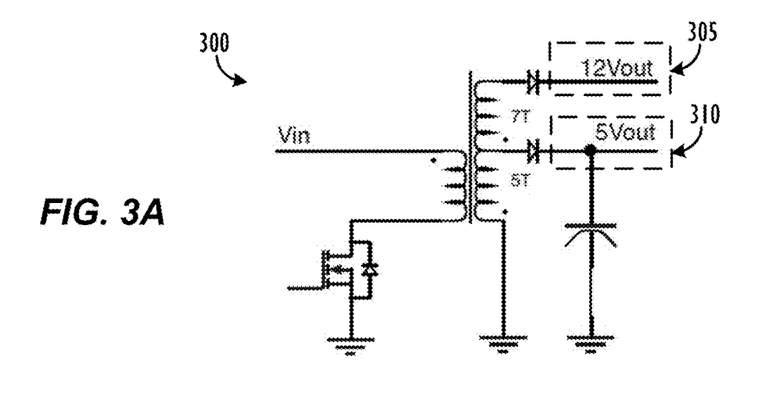
FIG. 3A illustrates an exemplary tapped winding flyback converter with two output voltages.

Turning first to FIG. 3A, an exemplary tapped winding flyback converter 300 is illustrated with two exemplary output voltages, 305 and 310. As may be seen, a 12V output is produced at 12Vout 305 by using all of the turns in the secondary winding of the transformer, whereas a 5V output is produced at 5Vout 310 by using five of the twelve turns in the secondary winding of the transformer. By using different numbers of turns in the secondary winding of the transformer, the flyback converter 300 may deliver two different output voltages while using the same duty cycle. For applications with a wide, adjustable output voltage range, changing the number of turns of the secondary winding of the transformer that are used for a given output voltage level allows the duty cycle to be kept within a relatively narrow range.

Figure 3B:
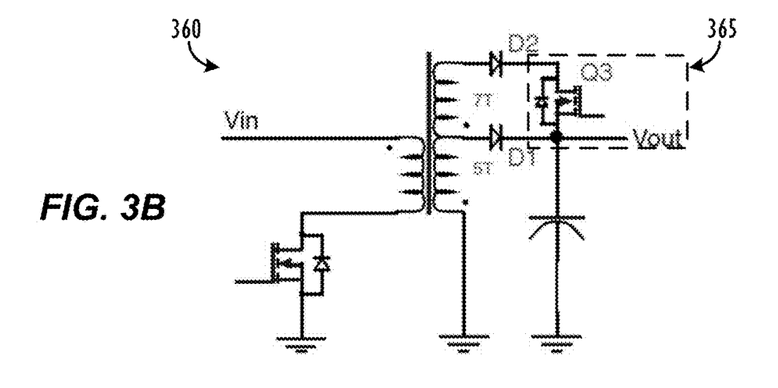
FIG. 3B illustrates an exemplary tapped winding flyback converter with two output voltages that are selectable via the use of a switch.

FIG. 3B illustrates an exemplary tapped winding flyback converter 360 that is capable of providing three exemplary output voltages (e.g., 20V, 12V, or 5V) that are selectable via the use of a switch, e.g., switch Q3 (shown in box 365). For example, when switch Q3 is turned 'on,' the flyback converter 360 may be capable of producing a 12V output (employing all the turns of the secondary winding), whereas, when switch Q3 is turned 'off,' the flyback converter 360 may be capable of producing a 5V output (employing only five turns of the secondary winding). By using the switch Q3, the exemplary tapped winding flyback converter 360 may generate different output voltages using a relatively narrow duty cycle range. Flyback converter 360 is shown as using diodes D1 and D2 on the output side. It is to be understood that the diodes on the output side could also be replaced by the use of MOSFETs (or other suitable switching devices). In particular, in some designs, a synchronous rectifier may be used at the ground side of the secondary winding, such that it is easier to drive.

Figure 4:
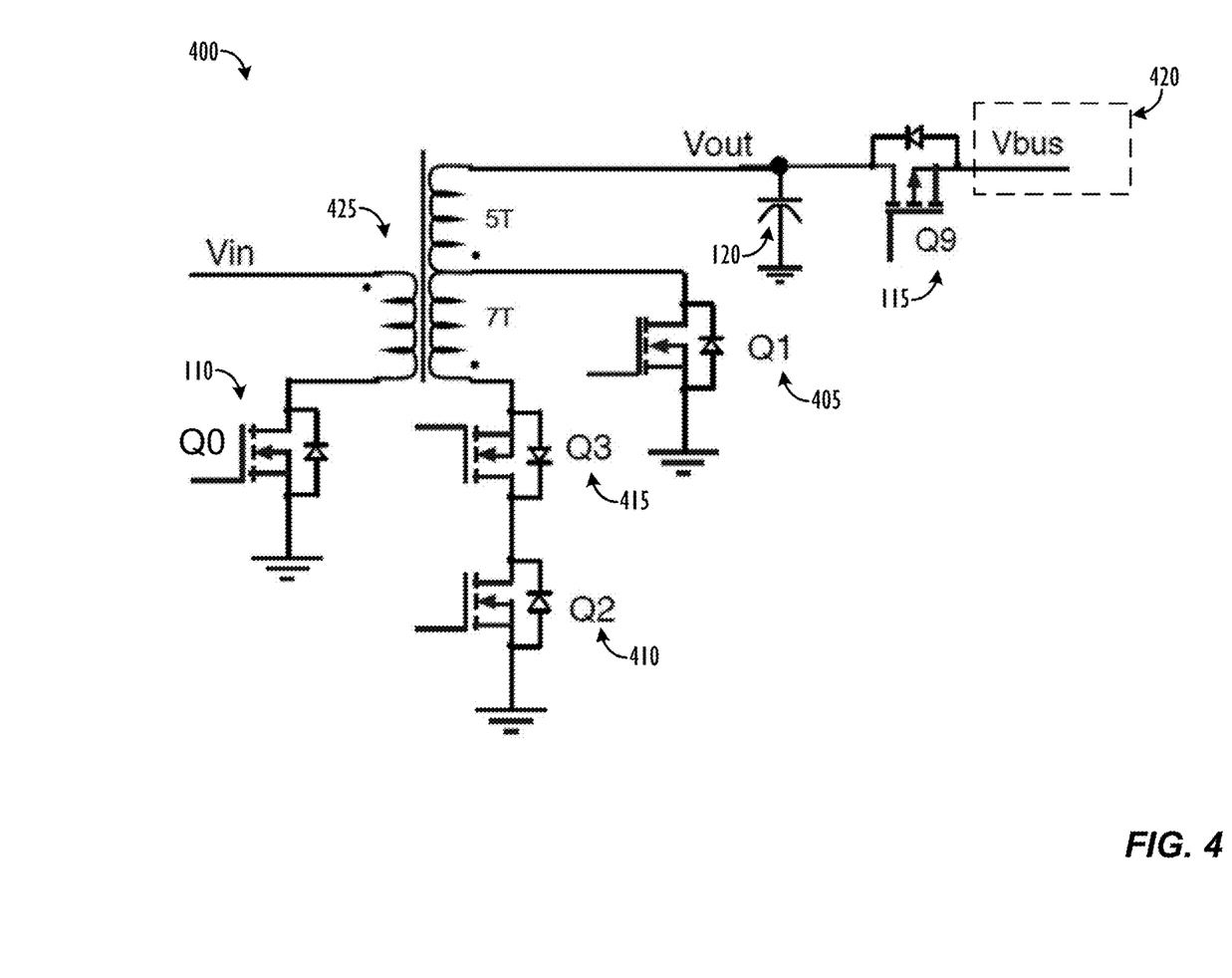
FIG. 4 illustrates an exemplary tapped winding flyback converter with synchronous rectification and three possible output voltages that are selectable via the use of pulse width modulation and/or one or more switches.

Turning now to FIG. 4, an exemplary tapped winding flyback converter 400 is illustrated, with synchronous rectification (at the ground side) and three possible output voltages that are selectable via the use of PWM duty cycle and/or one or more switches. Circuit elements numbered lxx in FIG. 4 may be considered as sharing similar structure and functionality to the correspondingly-numbered elements shown and described with reference to FIG. 1 above. As discussed above with reference to FIG. 3B, the transformer 425 in flyback converter 400 has a tapped secondary winding, in this case, tapped at the fifth turn of the secondary winding. It will be appreciated that the secondary winding may tapped at different numbers of turns, and that the decision to tap at the fifth turn, as is illustrated in FIG. 4, is but one exemplary choice. It should be appreciated that with different tappings of the secondary windings, different duty cycles may be needed to produce the desired first and second voltage output levels. One distinction between the designs of FIG. 3B and FIG. 4 is that the diodes D1 and D2 of FIG. 3B have been replaced with switches in FIG. 4, e.g., transistor-based switches Q1 (405) and Q2 (410), which act as a synchronous rectifier (SR) to provide greater conversion efficiency for the converter. According to some embodiments, the SR output stages may include metal-oxide-semiconductor field-effect transistors (MOSFET). The MOSFETs may be actively controlled and driven so as to rectify the output waveform from the transformer in the same way that the diode is used in other power converter designs (e.g., FIG. 3B), while avoiding high diode voltage drops (e.g., ~0.7V) when conducting current.

According to some embodiments of the flyback converter circuit 400 of FIG. 4, the operation of the primary side switch can be the same for the low (i.e., 5V, in this example) and intermediate (i.e., 12V, in this example) output modes. In other words, when switch Q3 (415) is turned 'on,' all 12 turns for the secondary winding may be employed, leading to a 12V output level on Vbus 420. When switch Q3 (415) is turned 'off,' however, only 5 turns for the secondary winding may be employed, leading to a 5V output level on Vbus 420. The PWM duty cycle and switching frequency for each of these two output voltage levels (i.e., 12Vout with Q3 'on' and 5Vout with Q3 'off') can be the same. This simplifies the design over other flyback converter designed because, e.g., the circuit only has to deal with adjusting operating parameters to switch between producing the higher voltage output levels, e.g., 12V and 20V, on Vbus 420. As illustrated in FIG. 4, switches Q3 and Q2 may be connected in series between the secondary winding of the transformer and ground, whereas switch Q1 may be connected between the tap point on the secondary winding and ground. Therefore, when switch Q3 is turned off, switch Q1 may be utilized so that the flyback converter 400 will use only a portion of the secondary windings of the transformer (e.g., FIG. 4 shows that 5 turns will be used) to generate the low 5V output voltage. When switch Q3 is turned on, flyback converter 400 would produce the intermediate 12V output voltage because the circuit will use the whole secondary winding of the transformer.

Switch Q3's Vds voltage in flyback converter 400 will depend on the difference in the turns-ratio for two output voltage ranges. For example, in the five turn-seven turn exemplary circuit shown in FIG. 4, the Vds voltage across Q3 will be 7V (if leakage inductance is ignored). Switch Q3 may be implemented as an N-FET, P-FET, or any other power switch that is always 'on' for higher output voltages.

According to some embodiments, by using the tapped winding, it may lower the voltage rating required for Switch Q3, which may allow lower cost components to be used. As mentioned above with reference to FIG. 1, switch Q9 (115) may be utilized to disconnect the output side of the power conversion apparatus from the output load under faulty or abnormal operating conditions.

Figure 5A:
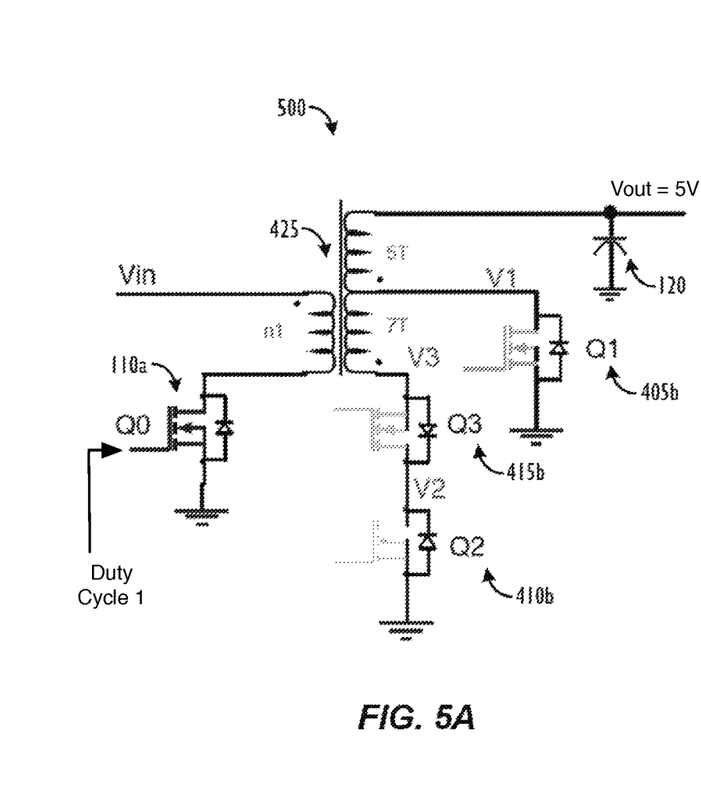
FIGS. 5A and 5B illustrate various switch configurations for an exemplary tapped winding flyback converter with synchronous rectification and capable of producing three output voltages that are selectable via the use of pulse width modulation and/or one or more switches that is configured to operate at a first output voltage level.
Figure 5B:
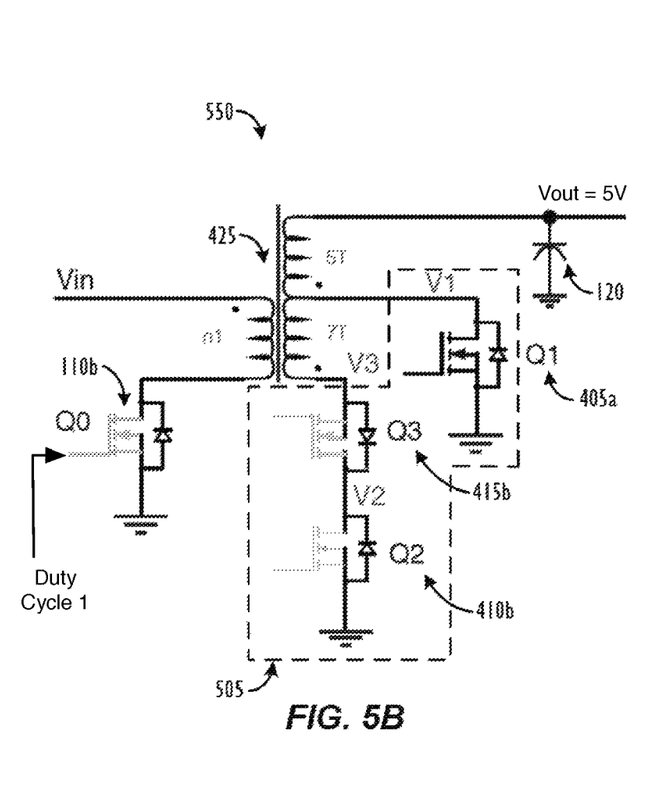

FIGS. 5A and 5B illustrate various switch configurations for the exemplary tapped winding flyback converter of FIG. 4 with synchronous rectification and capable of producing three output voltages that are selectable via the use of pulse width modulation and/or one or more switches that is configured to operate at a first output voltage level, e.g., 5V. In general, element numerals with an 'a' suffix refer to switches in an 'on' state, and element numerals with a 'b' suffix refer to switches in an 'off' state. Configuration 500 of FIG. 5A shows an improved flyback converter wherein switch Q0 (110a) is 'on,' and switches Q1 (405b), Q2 (410b), and Q3 (415b) are 'off.' Configuration 550 of FIG. 5B shows an improved flyback converter, wherein switch Q1 (405a) is 'on,' and switches Q0 (110b), Q2 (410b), and Q3 (415b) are 'off.' As shown in configuration 550, by turning Q2 (410b) and Q3 (415b) 'off,' while synchronously rectifying the output signal using Q1 (405a) and setting the duty cycle of the flyback converter at a predetermined level using Q0 (110b), the converter may produce a desired output, e.g., a 5V output. As shown in box 505, by turning Q2 (410b) and Q3 (415b) 'off' and Q1 (405a) 'on,' the low terminal (i.e., the bottom) of the secondary winding of transformer 425 is floating, thus causing the circuit to act as a traditional flyback converter with a 5-turn winding.

Figure 6A:
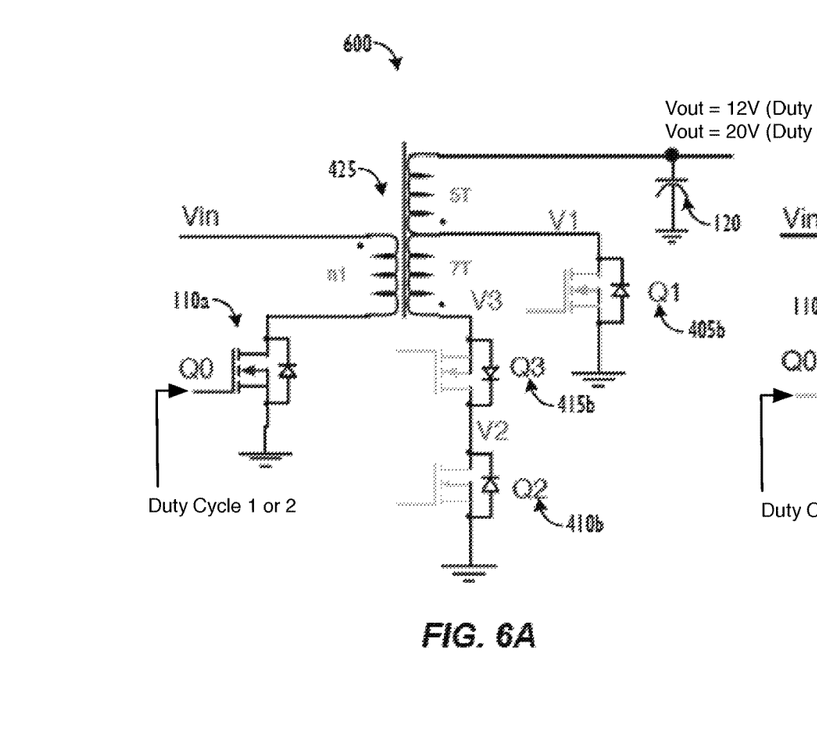
FIGS. 6A and 6B illustrate various switch configurations for an exemplary tapped winding flyback converter with synchronous rectification and capable of producing three output voltages that are selectable via the use of pulse width modulation and/or one or more switches that is configured to operate at a second or a third output voltage level.
Figure 6B:
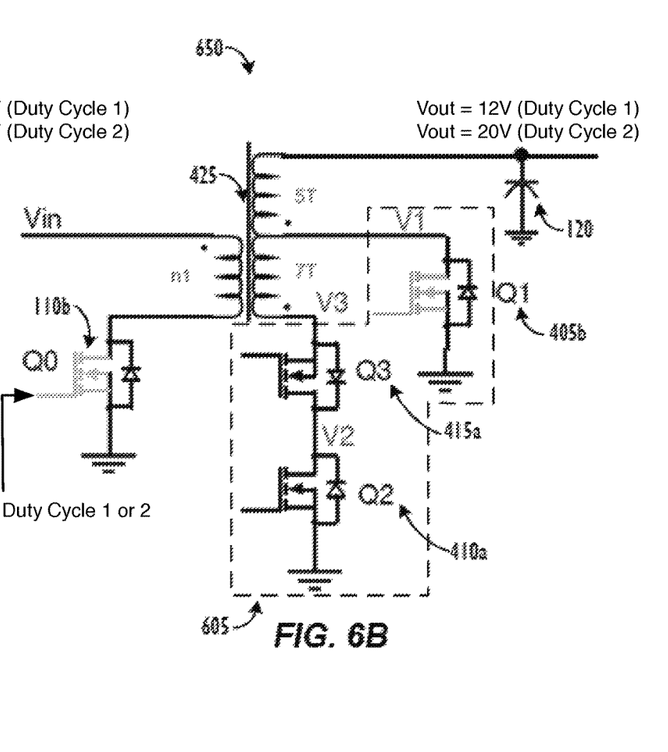

FIGS. 6A and 6B illustrate various switch configurations for the exemplary tapped winding flyback converter of FIG. 4 with synchronous rectification and capable of producing three output voltages that are selectable via the use of pulse width modulation and/or one or more switches that is configured to operate at a second or a third output voltage level, e.g., 12V or 20V. Configuration 600 of FIG. 6A shows an improved flyback converter wherein switch Q0 (110a) is 'on,' and switches Q1 (405b), Q2 (410b), and Q3 (415b) are 'off.' Configuration 650 of FIG. 6B shows an improved flyback converter, wherein switches Q2 (410a), and Q3 (415a) are 'on,' and switches Q0 (110b) and Q1 (110b) are 'off.' As shown in configuration 650, by turning Q3 (415a) 'on,' while synchronously rectifying the output signal using Q2 (410a) and controlling the duty cycle of the flyback converter using Q0 (110), the converter may produce two desired outputs, e.g., a 12V output and a 20V output, based on the duty cycle of Q0 (110). As shown in box 605, by turning Q3 (415b) 'on' and Q1 (405b) 'off, with Q2 (410b) running as a synchronous rectifier, the intermediate path of the secondary winding of the transformer is not grounded, thus causing the circuit to act as a traditional flyback converter, using all 12 turns of the exemplary secondary winding. As may now be understood, increasing the duty cycle of Q0 (110) by predetermined amounts can cause the output voltage to rise from 12V to 20V and, vice versa, decreasing the duty cycle of Q0 (110) by predetermined amounts can cause the output voltage to lower from 20V to 12V, all while maintaining switches Q1 (405), Q2 (410), and Q3 (415) in the same positions.

Figure 7:
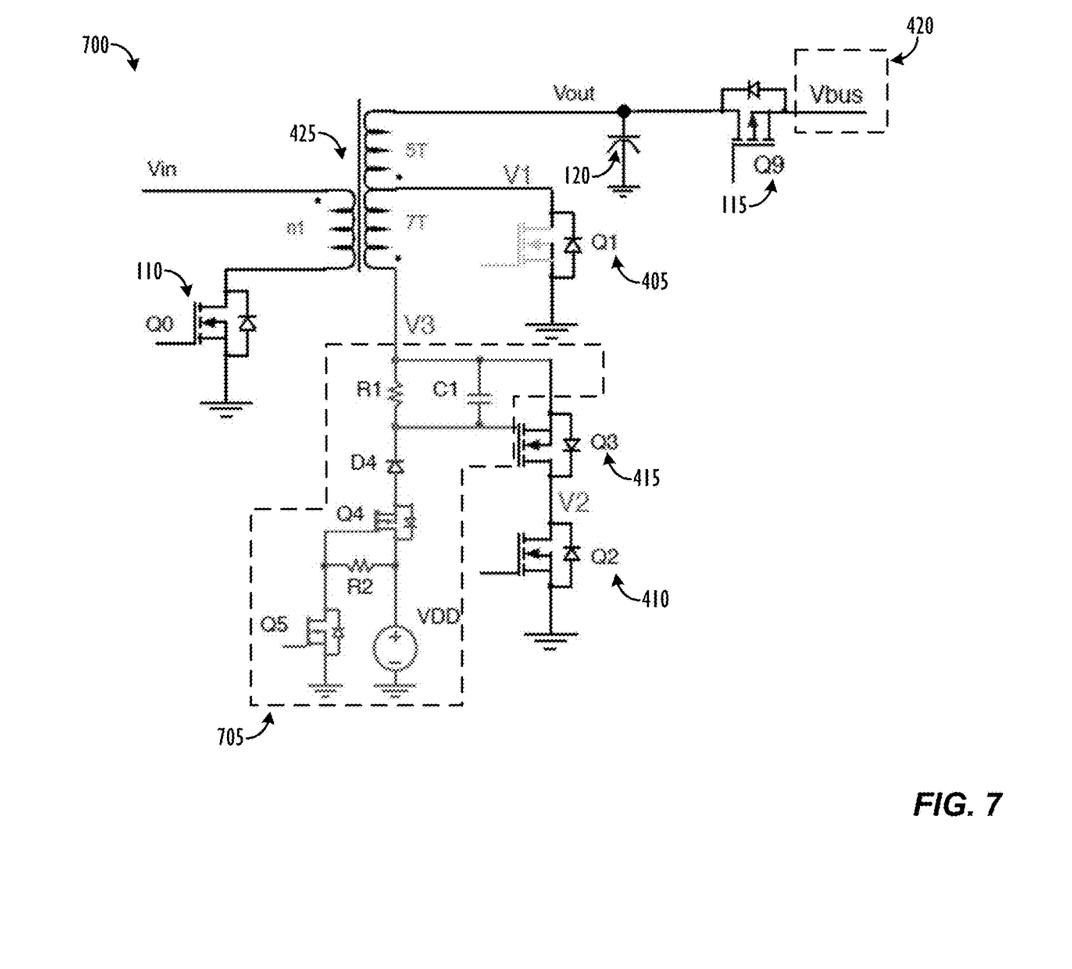
FIG. 7 illustrates an exemplary drive circuit for controlling a switch of a tapped winding flyback converter with synchronous rectification and three output voltages that are selectable via the use of pulse width modulation and/or the switch.

FIG. 7 illustrates an exemplary drive circuit 705 for controlling a switch of a tapped winding flyback converter 700 with synchronous rectification and three output voltages that are selectable via the use of pulse width modulation and/or the switch. According to some of the embodiments described above, switch Q3 (415) may be considered 'floating,' and, thus, may not necessarily be able to be driven directly. For example, because Q3 (415) may be floating with an unknown voltage, it may not be able to be driven by a signal that is at 5V with respect to ground. According to some embodiments, a dedicated integrated circuit (IC) or transformer may be used to directly drive switch Q3 (415). However, such solutions may add undesirable levels of complication and/or cost.

Thus, drive circuit 705 provides one example circuit for controlling a switch Q3 (415) of tapped winding flyback converter 700. Drive circuit 705 may comprise: resistor R1 in parallel with capacitor C1, connected in series with a diode D4 and an additional switch Q4, which is, in turn, connected in parallel with a resistor R2, which is, in turn, connected in parallel with another switch Q5 and voltage source VDD. According to some embodiments, the gate drive for switch Q5 will turn 'on' when the associated logic circuitry indicates that the flyback converter 700 needs to produce an output voltage at either the 12V or 20V levels (i.e., that Q3 needs to be turned 'on').

When switches Q0, Q4, and Q5 are 'on,' and switches Q1, Q2, and Q3 are 'off,' V3 may be higher than VDD. Thus, D4 will block the high voltage, i.e., the voltage across D4 will be equal to V3 minus VDD. When switches Q2, Q3, Q4, and Q5 are ON, and switches Q0 and Q1 are OFF, V3 will start to drop. When V3 drops to below VDD, VDD will charge C1 through Q4 and D4. According to some embodiments, Q3 may be turned 'on' when the voltage across C1 goes above Q3's Vth. C1 can then hold the charge for a few cycles in order to keep Q3 'on' for a while longer. When switch Q1 is ON, and switches Q0, Q2, Q3, Q4, and Q5 are OFF, V3 will equal (−Vout*7)/5, i.e., V3 will be −7V for the 5V output voltage level. Since the 'off' state Rds of Q4 is much larger than R1, the Vgs of switch Q3 is kept very low, thus keeping switch Q3 in the 'off' state.

EXAMPLES

The following examples pertain to additional embodiments.

Example 1 is a power conversion apparatus comprising: a transformer, wherein the transformer has a primary winding and a secondary winding; a first switch coupled to the primary winding so as to control the flow of current through the primary winding; a second switch coupled to a tapped portion of the secondary winding; and circuitry coupled to the first switch and the second switch, configured to: switch the first switch using a first duty cycle and turn the second switch off, so as to allow current to flow through a first number of turns of the secondary winding of the transformer, wherein the first number of turns is less than the total number of turns of the secondary winding of the transformer, thereby outputting a first output voltage level; switch the first switch using a second duty cycle and turn the second switch on, so as to allow current to flow through a second number of turns of the secondary winding of the transformer, wherein the second number of turns is larger than the first number of turns of the secondary winding of the transformer, thereby outputting a second output voltage level; and switch the first switch using a third duty cycle that is greater than the second duty cycle and turn the second switch on, so as to allow current to flow through the second number of turns of the secondary winding of the transformer, thereby outputting a third output voltage level.

Example 2 includes the subject matter of example 1, further comprising a synchronous rectifier (SR) circuit.

Example 3 includes the subject matter of example 1, wherein the first duty cycle is equal to the second duty cycle.

Example 4 includes the subject matter of example 1, wherein the first output voltage level comprises a first voltage, the second output voltage level comprises a second voltage which exceeds the first voltage, and the third output voltage level comprises a third voltage which exceeds the second voltage.

Example 5 includes the subject matter of example 1, wherein the first output voltage level comprises 5V, the second output voltage level comprises 12V, and the third output voltage level comprises 20V.

Example 6 includes the subject matter of example 1, wherein the first output voltage level comprises 10V, the second output voltage level comprises 20V, and the third output voltage level comprises 40V.

Example 7 includes the subject matter of example 1, wherein the first output voltage level comprises 5V, the second output voltage level comprises 9V, and the third output voltage level comprises 20V.

Example 8 includes the subject matter of example 1, wherein the first output voltage level comprises 5V, the second output voltage level comprises 15V, and the third output voltage level comprises 20V.

Example 9 includes the subject matter of example 1, wherein ratio of the first number of turns to the second number of turns is 5:12.

Example 10 includes the subject matter of example 1, wherein ratio of the first number of turns to the second number of turns is 1:2.

Example 11 includes the subject matter of example 1, wherein ratio of the first number of turns to the second number of turns is 5:9.

Example 12 includes the subject matter of example 1, wherein ratio of the first number of turns to the second number of turns is 1:3.

Example 13 includes the subject matter of example 1, further comprising a third switch configured to disconnect the output side of the power conversion apparatus under abnormal conditions.

Example 14 includes the subject matter of example 1, wherein the second switch comprises an N-FET or a P-FET.

Example 15 includes the subject matter of example 1, wherein the circuitry coupled to the second switch comprises an integrated circuit (IC) or a transformer.

Example 16 includes the subject matter of example 1, wherein the second number of turns of the secondary winding is equal to the total number of turns of the secondary winding.

Example 17 includes the subject matter of example 1, wherein the output voltage level produced by the power conversion apparatus is determined based on a requirement of a device that power is being delivered to.

Example 18 includes the subject matter of example 17, wherein the power conversion apparatus is configured to deliver power over a USB-C cable.

Example 19 is a method of operating a power conversion circuit comprising a transformer, first and second switches, and circuitry operating the first and second switches to output a regulated output voltage level, the method comprising: switching the first switch using a first duty cycle and turning the second switch off, so as to allow current to flow through a first number of turns of the secondary winding of the transformer, wherein the first number of turns is less than the total number of turns of the secondary winding of the transformer, thereby outputting a first output voltage level; switching the first switch using a second duty cycle and turning the second switch on, so as to allow current to flow through a second number of turns of the secondary winding of the transformer, wherein the second number of turns is greater than the first number of turns, thereby outputting a second output voltage level; and switching the first switch using a third duty cycle that is greater than the first duty cycle and turning the second switch on, so as to allow current to flow through the second number of turns of the secondary winding of the transformer, thereby outputting a third output voltage level.

Example 20 includes the subject matter of example 19, wherein the first output voltage level comprises 5V, the second output voltage level comprises 12V, and the third output voltage level comprises 20V.

Example 21 includes the subject matter of example 19, wherein ratio of the first number of turns to the second number of turns is 5:12.

Example 22 includes the subject matter of example 19, wherein the power conversion circuit further comprises a third switch configured to disconnect the power conversion circuit under abnormal conditions.

Example 23 includes the subject matter of example 19, wherein the circuitry coupled to the second switch comprises an integrated circuit (IC) or a transformer.

Example 24 includes the subject matter of example 19, wherein the second number of turns is equal to the total number of turns of the secondary winding.

Example 25 includes the subject matter of example 19, wherein the output voltage level produced by the power conversion circuit is determined based on a requirement of the output system.

Example 26 includes the subject matter of example 19, wherein the first duty cycle is equal to the second duty cycle.

Example 27 is a power circuit comprising: a transformer configured to store energy and outputting a plurality of output voltage levels, the transformer including a primary side winding and a secondary side winding; a first switching device arranged in series with the secondary side winding of the transformer, so as to change the turn-ratio of the secondary side winding from producing a first output voltage level to producing a second or third output voltage level; and a second switching device arranged in series with the primary side winding of the transformer, so as to change the duty cycle of the primary side winding from producing the first or second output voltage levels to producing the third output voltage level, wherein the first output voltage level is less than the second output voltage level and the third output voltage level, and wherein the second voltage level is less than the third voltage level.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

The invention claimed is:

1. A power conversion apparatus comprising:
a transformer, wherein the transformer has a primary winding and a tapped secondary winding having a first number of turns and a second number of turns, wherein the first number of turns is less than a total number of turns of the secondary winding of the transformer and wherein the second number of turns is larger than the first number of turns of the secondary winding of the transformer;
a first switch coupled to the primary winding so as to control a flow of current through the primary winding;
a second switch coupled in series between the secondary winding and ground; and
circuitry coupled to the first switch and the second switch, configured to:
switch the first switch using a first duty cycle and turn the second switch off, so as to allow current to flow through the first number of turns of the secondary winding of the transformer, thereby outputting a low voltage;
switch the first switch using the first duty cycle and turn the second switch on, so as to allow current to flow through a second number of turns of the secondary winding of the transformer, thereby outputting an intermediate voltage; and
switch the first switch using a second duty cycle and turn the second switch on, so as to allow current to flow through the second number of turns of the secondary winding of the transformer, thereby outputting a high voltage.

2. The apparatus of claim 1, further comprising a synchronous rectifier (SR) circuit.

3. The apparatus of claim 2, comprising a first synchronous rectifier coupled to the first number of turns of the secondary winding and a second synchronous rectifier coupled to the second number of turns of the secondary winding.

4. The apparatus of claim 1, wherein the low voltage is 5V, the intermediate voltage is 12V, and the high voltage is 20V.

5. The apparatus of claim 1, wherein a ratio of the first number of turns to the second number of turns is 5:12.

6. The apparatus of claim 1, further comprising a third switch configured to disconnect the output side of the power conversion apparatus under abnormal conditions.

7. The apparatus of claim 1, wherein the second switch comprises an N-FET or a P-FET.

8. The apparatus of claim 1, wherein the second number of turns of the secondary winding is equal to the total number of turns of the secondary winding.

9. The apparatus of claim 1, wherein the output voltage produced by the power conversion apparatus is determined based on a requirement of a device that power is being delivered to.

10. The apparatus of claim 9, wherein the power conversion apparatus is configured to deliver power over a USB-C cable.

11. A power circuit comprising:
a transformer configured to store energy and output a plurality of output voltage levels, the transformer including a primary side winding and a secondary side winding;
a first switching device arranged in series with the primary side winding of the transformer, so as to change a duty cycle of the primary side winding from producing the low or intermediate output voltage to producing the high output voltage;
a second switching device arranged in series between the secondary side winding of the transformer and ground so as to use a different number of turns of the secondary side winding to produce a low output voltage and an intermediate or high output voltage, respectively.

12. The power circuit of claim 11, further comprising a third switching device coupled in series with a portion of the secondary side winding and configured to operate as a synchronous rectifier when producing the low output voltage.

13. The power circuit of claim 11, further comprising a fourth switching device coupled in series with the secondary side winding and the second switching device and configured to operate as a synchronous rectifier when producing the intermediate and high output voltages.

14. A power converter comprising:
a transformer having a primary winding and a secondary winding having a tap;
a first switch coupled in series with the primary winding to control a flow of current through the primary winding;
a second switch coupled to the tap of the secondary winding so as to be in series with a first portion of the secondary winding;
a third switch and a fourth switch coupled in series with each other and in series with an entirety of the secondary winding; and
circuitry coupled to the first switch and the fourth switch, configured to:
switch the first switch using a first duty cycle and turn the fourth switch off, so as to allow current to flow through the first portion of the secondary winding of the transformer, and using the second switch as a synchronous rectifier, thereby outputting a low voltage;
switch the first switch using the first duty cycle and turn the fourth switch on, so as to allow current to flow through the entirety of the secondary winding of the transformer, and using the second switch as a synchronous rectifier, thereby outputting an intermediate voltage; and
switch the first switch using a second duty cycle and turn the fourth switch on, so as to allow current to flow through the entirety of the secondary winding of the transformer, and using the second switch as a synchronous rectifier, thereby outputting a high voltage.

15. The power converter of claim 14, wherein the low voltage is 5V, the intermediate voltage is 12V, and the high voltage is 20V.

16. The power converter of claim 14, wherein a ratio of a number of turns in the first portion of the secondary winding to a number of turns in the entirety of the secondary winding is 5:12.

17. The power converter of claim 14, further comprising a third switch configured to disconnect the output side of the power conversion apparatus under abnormal conditions.

18. The power converter of claim 14, wherein the output voltage produced by the power conversion apparatus is determined based on a requirement of a device that power is being delivered to.

19. The power converter of claim 14, wherein the power conversion apparatus is configured to deliver power over a USB-C cable.

* * * * *